United States Patent
Song

(10) Patent No.: US 10,951,870 B2
(45) Date of Patent: Mar. 16, 2021

(54) DIGITAL IMAGE CONVERSION METHOD AND APPARATUS, STORAGE MEDIUM, AND DEVICE

(71) Applicant: Baidu Online Network Technology (Beijing) Co., Ltd., Beijing (CN)

(72) Inventor: Ye Song, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 22 days.

(21) Appl. No.: 15/740,736

(22) PCT Filed: Dec. 25, 2015

(86) PCT No.: PCT/CN2015/099009
§ 371 (c)(1),
(2) Date: Dec. 28, 2017

(87) PCT Pub. No.: WO2017/004953
PCT Pub. Date: Jan. 12, 2017

(65) Prior Publication Data
US 2018/0199019 A1    Jul. 12, 2018

(30) Foreign Application Priority Data
Jul. 3, 2015  (CN) .......................... 201510387849.3

(51) Int. Cl.
*H04N 7/01*    (2006.01)
*H04N 1/64*    (2006.01)
(Continued)

(52) U.S. Cl.
CPC ............. *H04N 9/67* (2013.01); *G09G 3/3413* (2013.01); *G09G 5/02* (2013.01); *H04N 1/646* (2013.01); *H04N 7/01* (2013.01); *G09G 2340/06* (2013.01)

(58) Field of Classification Search
None
See application file for complete search history.

(56) References Cited

U.S. PATENT DOCUMENTS 5,784,050 A     7/1998  Corry
8,102,569 B1 *  1/2012  Goel ................... H04N 1/6058
                                               358/2.1
(Continued)

FOREIGN PATENT DOCUMENTS

CN    101022551 A    8/2007
CN    101163244 A    4/2008
(Continued)

OTHER PUBLICATIONS

International Search Report, dated Apr. 1, 2016, for PCT/CN2015/099009, 2 pages.

*Primary Examiner* — Aaron M Richer
(74) *Attorney, Agent, or Firm* — Seed IP Law Group LLP

(57) ABSTRACT

Embodiments of the present disclosure disclose a digital image conversion method and apparatus. The method includes: acquiring an RGB indication signal of a forward-correlated pixel of a current pixel; comparing an RGB signal of the current pixel with the RGB indication signal of the forward-correlated pixel; acquiring a YUV indication signal of the forward-correlated pixel and assigning the YUV indication signal to a YUV signal of the current pixel, if the RGB signal of the current pixel is identical to the RGB indication signal of the forward-correlated pixel; and recalculating the YUV signal of the current pixel according to the RGB signal of the current pixel, if the RGB signal of the current pixel is different from the RGB indication signal of the forward-correlated pixel. The digital image conversion method and apparatus disclosed in the embodiments of the (Continued)

present disclosure can effectively reduce the amount of calculation required for image data conversion.

13 Claims, 11 Drawing Sheets

(51) Int. Cl.
*G09G 5/02* (2006.01)
*H04N 9/67* (2006.01)
*G09G 3/34* (2006.01)

(56) References Cited

U.S. PATENT DOCUMENTS

| | | | |
|---|---|---|---|
| 9,026,615 B1* | 5/2015 | Sirton | H04L 65/60 |
| | | | 709/217 |
| 2004/0120588 A1* | 6/2004 | Seroussi | G06T 9/005 |
| | | | 382/238 |
| 2007/0040849 A1* | 2/2007 | Jeffrey | G09G 5/363 |
| | | | 345/629 |
| 2008/0025602 A1 | 1/2008 | Won et al. | |
| 2009/0052772 A1* | 2/2009 | Speirs | G09G 3/2092 |
| | | | 382/166 |
| 2009/0263013 A1 | 10/2009 | Xiong et al. | |

FOREIGN PATENT DOCUMENTS

| | | |
|---|---|---|
| CN | 101299799 A | 11/2008 |
| CN | 101729912 A | 6/2010 |
| CN | 104408749 A | 3/2015 |
| JP | 9-252411 A | 9/1997 |
| JP | 9-252422 A | 9/1997 |
| JP | 2005-192230 A | 7/2005 |
| JP | 2008-142421 A | 6/2008 |
| JP | 2009232217 A | 10/2009 |

* cited by examiner

DIGITAL IMAGE CONVERSION METHOD AND APPARATUS, STORAGE MEDIUM, AND DEVICE

CROSS-REFERENCE TO RELATED APPLICATION

This application is related to and claims priority from Chinese Application No. 201510387849.3 filed on Jul. 3, 2015 and entitled "Digital image conversion method and apparatus" in the name of Baidu Online Network Technology (Beijing) Co., Ltd., the entire disclosure of which is hereby incorporated by reference.

TECHNICAL FIELD

Embodiments of the present disclosure relate to the field of image processing technology, and more particularly to a digital image conversion method and apparatus, a storage medium, and a device.

BACKGROUND

During the processing of image data, especially video image data, image data in RGB format often needs to be converted into image data in YUV format. An image in RGB format may be converted into an image in YUV format by using the following equation:

$$\begin{pmatrix} Y \\ U \\ V \end{pmatrix} = \begin{pmatrix} 0.3 & 0.59 & 0.11 \\ -0.15 & -0.29 & 0.44 \\ 0.51 & -0.52 & -0.095 \end{pmatrix} \begin{pmatrix} R \\ G \\ B \end{pmatrix}.$$

To convert an image in RGB format into an image in YUV format, pixel-wise image conversion is performed according to the above-mentioned equation. Although this method achieves the accurate conversion of the image format, a large amount of calculation is required. This method is not suitable for the implementation of image format conversion on platforms with limited computing resources.

SUMMARY

In view of the above technical problems, embodiments of the present disclosure provide a digital image conversion method and apparatus, a storage medium, and a device, to reduce the amount of calculation required for image conversion.

According to a first aspect, an embodiment of the present disclosure provides a digital image conversion method, comprising: acquiring an RGB indication signal of a forward-correlated pixel of a current pixel; comparing an RGB signal of the current pixel with the RGB indication signal of the forward-correlated pixel; acquiring a YUV indication signal of the forward-correlated pixel and assigning the YUV indication signal to a YUV signal of the current pixel, if the RGB signal of the current pixel is identical to the RGB indication signal of the forward-correlated pixel; and recalculating the YUV signal of the current pixel according to the RGB signal of the current pixel, if the RGB signal of the current pixel is different from the RGB indication signal of the forward-correlated pixel.

According to a second aspect, an embodiment of the present disclosure further provides a digital image conversion apparatus, comprising: an indication signal acquiring module, configured to acquire an RGB indication signal of a forward-correlated pixel of a current pixel; a comparison module, configured to compare an RGB signal of the current pixel with the RGB indication signal of the forward-correlated pixel; an assignment module, configured to acquire a YUV indication signal of the forward-correlated pixel and assign the YUV indication signal to a YUV signal of the current pixel, if the RGB signal of the current pixel is identical to the RGB indication signal of the forward-correlated pixel; and a recalculation module, configured to recalculate the YUV signal of the current pixel according to the RGB signal of the current pixel, if the RGB signal of the current pixel is different from the RGB indication signal of the forward-correlated pixel.

According to a third aspect, an embodiment of the present disclosure provides a storage medium comprising computer executable instructions, the computer executable instructions when executed by a processor of a computer, causing the processor to execute a digital image conversion method, wherein the method comprises: acquiring an RGB indication signal of a forward-correlated pixel of a current pixel; comparing an RGB signal of the current pixel with the RGB indication signal of the forward-correlated pixel; acquiring a YUV indication signal of the forward-correlated pixel and assigning the YUV indication signal to a YUV signal of the current pixel, if the RGB signal of the current pixel is identical to the RGB indication signal of the forward-correlated pixel; and recalculating the YUV signal of the current pixel according to the RGB signal of the current pixel, if the RGB signal of the current pixel is different from the RGB indication signal of the forward-correlated pixel.

According to a fourth aspect, an embodiment of the present disclosure provides a device, comprising: one or more processors; a memory; and one or more programs, the one or more programs being stored in the memory, and when executed by the one or more processors, causing the one or more processors to perform the following operations: acquiring an RGB indication signal of a forward-correlated pixel of a current pixel; comparing an RGB signal of the current pixel with the RGB indication signal of the forward-correlated pixel; acquiring a YUV indication signal of the forward-correlated pixel and assigning the YUV indication signal to a YUV signal of the current pixel, if the RGB signal of the current pixel is identical to the RGB indication signal of the forward-correlated pixel; and recalculating the YUV signal of the current pixel according to the RGB signal of the current pixel, if the RGB signal of the current pixel is different from the RGB indication signal of the forward-correlated pixel.

In the technical solutions provided in the embodiments of the present disclosure, before a YUV component signal corresponding to a pixel is calculated, an RGB component signal of the pixel is compared with an RGB component signal of a previous pixel. If these two signals are the same, a YUV component signal of the previous pixel is directly copied. The present disclosure takes into consideration the correlation between different pixels during the digital image conversion, and the amount of calculation required for image conversion is reduced effectively by using the correlation between pixels.

BRIEF DESCRIPTION OF THE DRAWINGS

The drawings for showing embodiments of the present disclosure will be briefly described below, in order to describe the technical solutions of embodiments of the present disclosure clearly. Of course, the drawings merely show embodiments of the present disclosure. The skilled person in the art can modify or replace the drawings without needing any inventive effort. In the drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

First Embodiment

This embodiment provides a technical solution of a digital image conversion method. This technical solution may be executed by a digital image conversion apparatus.

Figure 1:
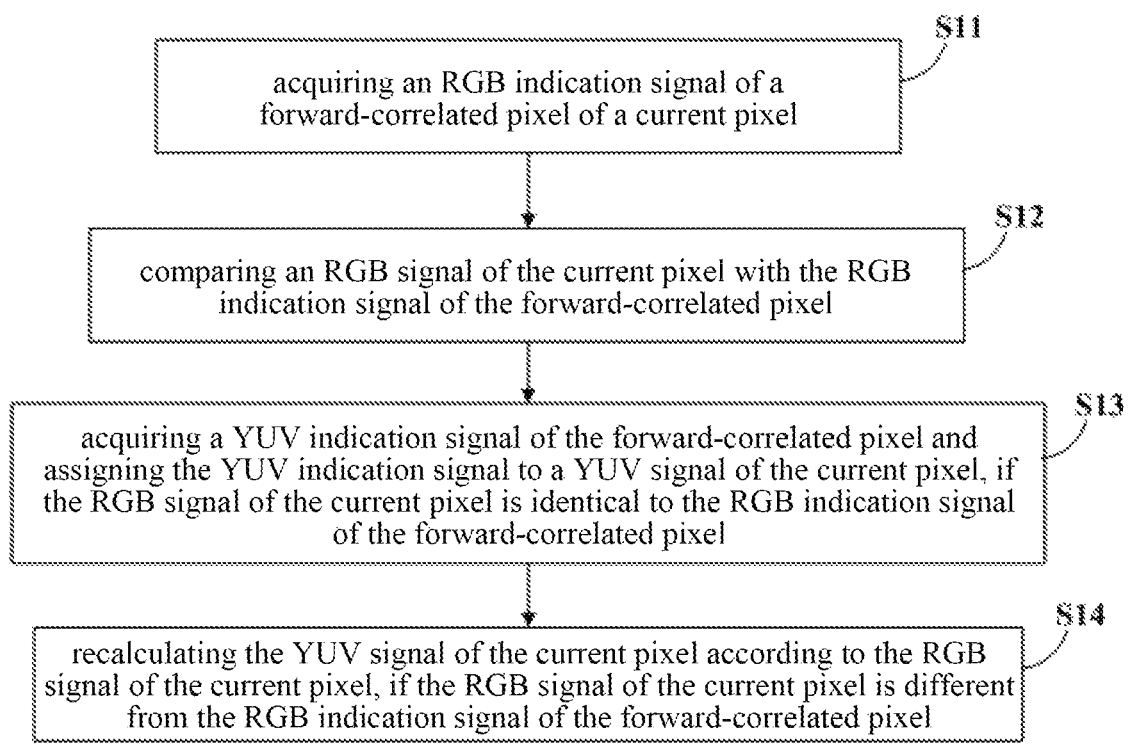
FIG. 1 is a flow chart of a digital image conversion method according to a first embodiment of the present disclosure.

Referring to FIG. 1, the digital image conversion method includes:

S11, an RGB indication signal of a forward-correlated pixel of a current pixel is acquired.

When the conversion of an RGB signal into a YUV signal is performed, generally all pixels in the image need to be traversed, that is, all the pixels need to be scanned one by one. When the traversal reaches a pixel in the image, the pixel is the current pixel.

In this embodiment, each current pixel has one forward-correlated pixel. The forward-correlated pixel is a pixel that is reached earlier than the current pixel during traversal, for example, located before the current pixel, and that has a strong correlation with the current pixel in space. For example, according to different YUV data formats, the forward-correlated pixel may be a previous pixel that is in the same row as the current pixel and that is closely adjacent to the current pixel, or a previous pixel that is in the same row as the current pixel that is in a column spaced apart from the current pixel by one column.

When data conversion is performed, first, the RGB indication signal of the forward-correlated pixel needs to be acquired. The RGB indication signal can completely represent values of an R component signal, a G component signal, and a B component signal of the forward-correlated pixel.

S12, an RGB signal of the current pixel is compared with the RGB indication signal of the forward-correlated pixel.

Specifically, an R component signal, a G component signal and a B component signal of the current pixel may be respectively compared with the R component signal, the G component signal and the B component signal that are represented by the RGB indication signal.

S13, a YUV indication signal of the forward-correlated pixel is acquired and assigned to a YUV signal of the current pixel, if the RGB signal of the current pixel is identical to the RGB indication signal of the forward-correlated pixel.

Specifically, when the R component signal, the G component signal and the B component signal of the current pixel are respectively identical to the R component signal, the G component signal and the B component signal that are represented by the RGB indication signal the forward-correlated pixel, it may be considered that the RGB signal of the current pixel is identical to the RGB indication signal of the forward-correlated pixel. In this case, it indicates that the RGB signal of the current pixel is completely identical to the RGB signal of the forward-correlated pixel. If the RGB signal of the current pixel and the RGB signal of the forward-correlated pixel are converted to a YUV color space, their YUV signals should also be completely the same.

Based on such a judgment, the YUV indication signal of the forward-correlated pixel may be acquired, and the value of the YUV component signal represented by the YUV indication signal may be assigned to the YUV signal of the current pixel. The YUV indication signal can completely represent values of a Y component signal, a U component signal, and a V component signal of the forward-correlated pixel.

S14, the YUV signal of the current pixel is recalculated according to the RGB signal of the current pixel, if the RGB signal of the current pixel is different from the RGB indication signal of the forward-correlated pixel.

If the RGB signal of the current pixel is different from the RGB indication signal of the forward-correlated pixel, the YUV signal of the current pixel cannot be determined according to the YUV indication signal of the forward-correlated pixel, and therefore the YUV signal of the current pixel needs to be recalculated.

In this embodiment, an RGB indication signal of a forward-correlated pixel of a current pixel is acquired; an RGB signal of the current pixel is compared with the RGB indication signal of the forward-correlated pixel; a YUV indication signal of the forward-correlated pixel is acquired and assigned to a YUV signal of the current pixel if the RGB signal of the current pixel is the same as the RGB indication signal of the forward-correlated pixel; and the YUV signal of the current pixel is recalculated according to the RGB signal of the current pixel if the RGB signal of the current pixel is different from the RGB indication signal of the forward-correlated pixel. In this way, the YUV signal of the current pixel can be determined according to the RGB signal of a previous pixel, thereby greatly reducing the amount of calculation required for conversion from an RGB signal to a YUV signal.

Second Embodiment

Based on the foregoing embodiment of the present disclosure, this embodiment further provides a technical solution of a digital image conversion method. In this technical solution, the acquiring an RGB indication signal of a forward-correlated pixel of a current pixel includes: acquiring, from a buffer, the RGB indication signal of the forward-correlated pixel of the current pixel; and after the recalculating the YUV signal of the current pixel according to the RGB signal of the current pixel, the method further includes: updating the RGB signal of the current pixel to the buffer.

Figure 2:
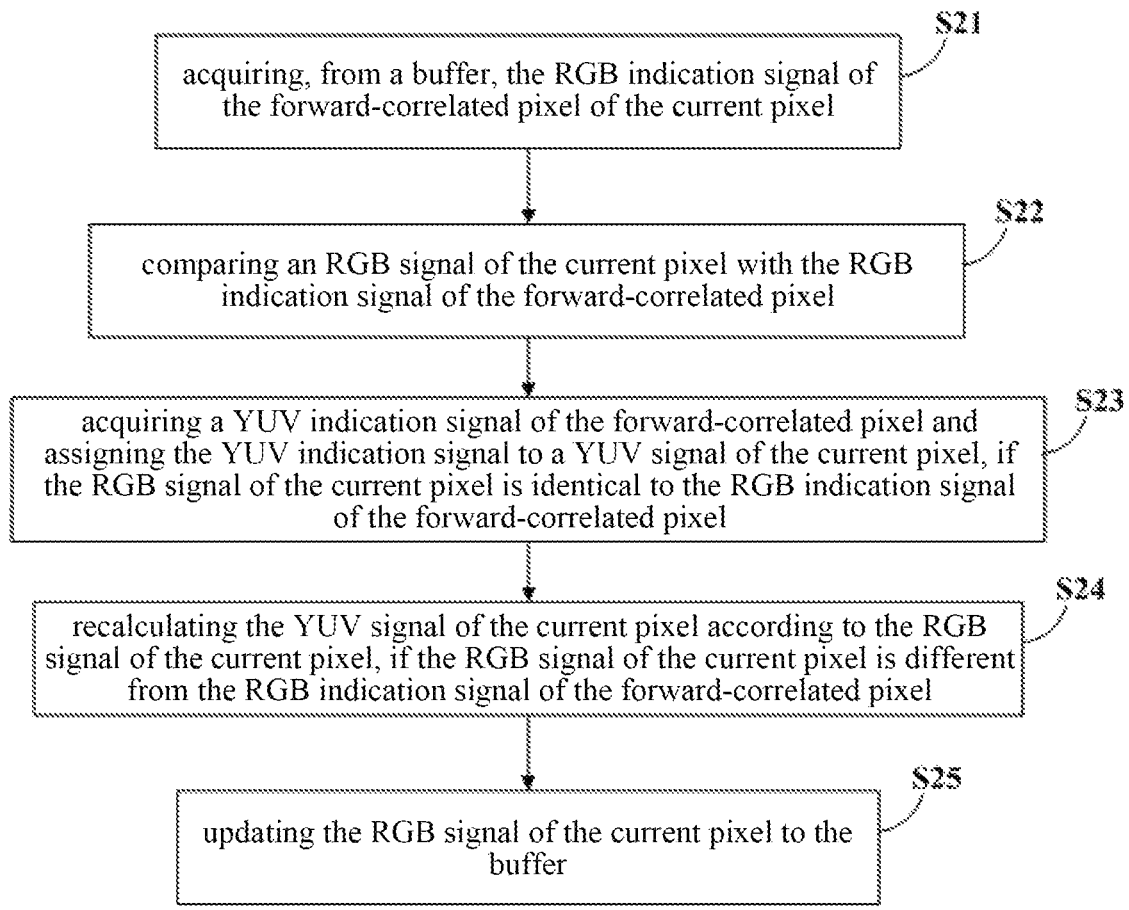
FIG. 2 is a flow chart of a digital image conversion method according to a second embodiment of the present disclosure.

Referring to FIG. 2, the digital image conversion method includes:

S21, an RGB indication signal of a forward-correlated pixel of a current pixel is acquired from a buffer.

In this embodiment, at least one buffer is provided. The buffer is specially configured to buffer the RGB indication signal of the forward-correlated pixel. When there are multiple signal storage forms, there may be multiple forward-correlated pixels at the same time, and accordingly, there are multiple buffers. In this way, acquiring the RGB indication signal of the forward-correlated pixel is specifically acquiring the RGB indication signal of the forward-correlated pixel from the buffer.

S22, an RGB signal of the current pixel is compared with the RGB indication signal of the forward-correlated pixel.

S23, a YUV indication signal of the forward-correlated pixel is acquired and assigned to a YUV signal of the current pixel, if the RGB signal of the current pixel is the same as the RGB indication signal of the forward-correlated pixel.

S24, the YUV signal of the current pixel is recalculated according to the RGB signal of the current pixel, if the RGB signal of the current pixel is different from the RGB indication signal of the forward-correlated pixel.

S25, the RGB signal of the current pixel is updated to the buffer.

To ensure the consistency between data stored in the buffer and the position of the current pixel, after the YUV signal of the current pixel is recalculated, the recalculated RGB signal of the current pixel needs to be updated to the buffer, for use as an RGB indication signal of a next forward-correlated pixel.

In this embodiment, an RGB indication signal of a forward-correlated pixel of a current pixel is acquired from a buffer; and after a YUV signal of the current pixel is recalculated, the YUV signal of the current pixel is updated to the buffer. In this way, the RGB indication signal of the forward-correlated pixel is stored using a fixed buffer, thereby facilitating the acquiring of the RGB indication signal of the forward-correlated pixel, and further reducing the amount of calculation required for data conversion.

Third Embodiment

Based on the foregoing embodiment of the present disclosure, this embodiment further provides a technical solution of a digital image conversion method. This technical solution is specially used for converting an RGB image into an image in YUV444 format. In this technical solution, the current pixel is determined by using the following method: determining a next pixel as the current pixel based on a progressive pixel traversal order. In addition, a previous pixel of the current pixel is determined as the forward-correlated pixel. The RGB indication signal is an RGB component signal, and the YUV indication signal is a YUV component signal.

Figure 3:
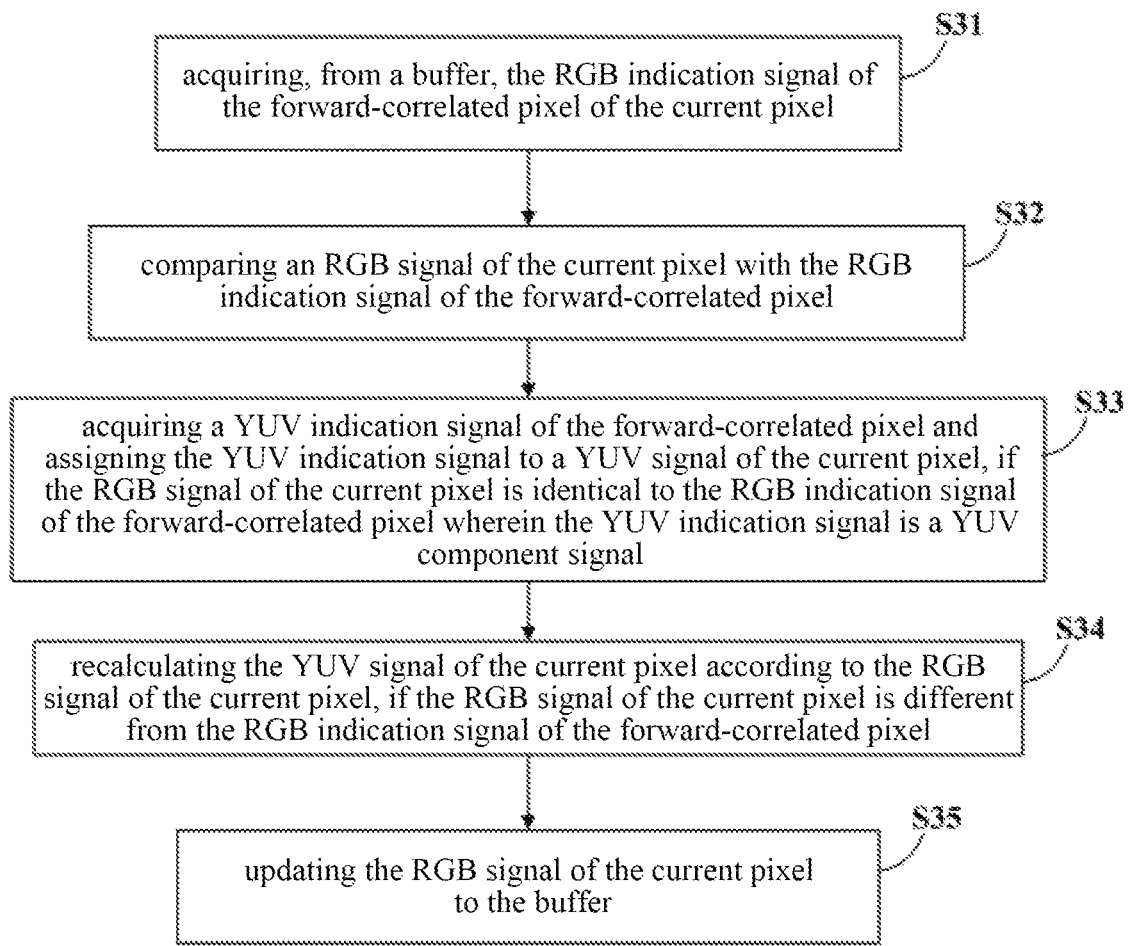
FIG. 3 is a flow chart of a digital image conversion method according to a third embodiment of the present disclosure.

Referring to FIG. 3, the digital image conversion method includes:

S31, an RGB indication signal of a forward-correlated pixel of a current pixel is acquired from a buffer.

Figure 4:
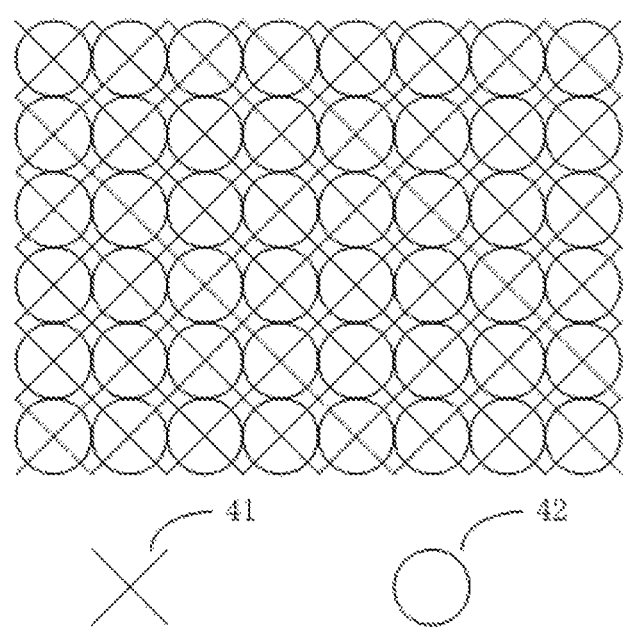
FIG. 4 is a schematic diagram showing a YUV444 data format.

FIG. 4 shows a YUV444 data format. Referring to FIG. 4, in the YUV444 format, each pixel has a complete YUV vector space. That is, each pixel not only has a corresponding Y component signal 41, but also has a corresponding U component signal 42 and V component signal 43.

In this embodiment, a traversal order of sequential row scanning is adopted. That is, the pixels in the image are traversed based on a progressive scanning order. In this case, in the determining of the current pixel, a next pixel is acquired as the current pixel based on the traversal order of sequential row scanning.

In the YUV444 data format, each pixel has a complete YUV vector space. Therefore, a pixel closest to the current pixel in space, that is, the previous pixel during sequential row scanning, may be used as the forward-correlated pixel of the current pixel. The RGB indication signal is an RGB component signal.

S32, an RGB signal of the current pixel is compared with the RGB indication signal of the forward-correlated pixel.

S33, a YUV indication signal of the forward-correlated pixel is acquired and assigned to a YUV signal of the current pixel, if the RGB signal of the current pixel is the same as the RGB indication signal of the forward-correlated pixel.

The YUV indication signal is a YUV component signal.

S34, the YUV signal of the current pixel is recalculated according to the RGB signal of the current pixel, if the RGB signal of the current pixel is different from the RGB indication signal of the forward-correlated pixel.

S35, the RGB signal of the current pixel is updated to the buffer.

In this embodiment, a next pixel is determined as the current pixel based on a progressive pixel traversal order, a previous pixel of the current pixel is determined as the forward-correlated pixel, thereby reducing the amount of calculation required for converting RGB image data into image data in YUV444 format.

Fourth Embodiment

Based on the foregoing embodiment of the present disclosure, this embodiment further provides a technical solution of a digital image conversion method. This technical solution is specially used for converting an RGB image into an image in YUV422 format. In this technical solution, the current pixel is determined by using the following method: determining a next pixel as the current pixel based on a progressive pixel traversal order. In addition, a pixel that is in the same row as the current pixel or in a previous row and that is in a column spaced apart from the current pixel by one column is determined as the forward-correlated pixel. The RGB indication signal is an RGB component signal, a YUV indication signal of a forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

Figure 5:
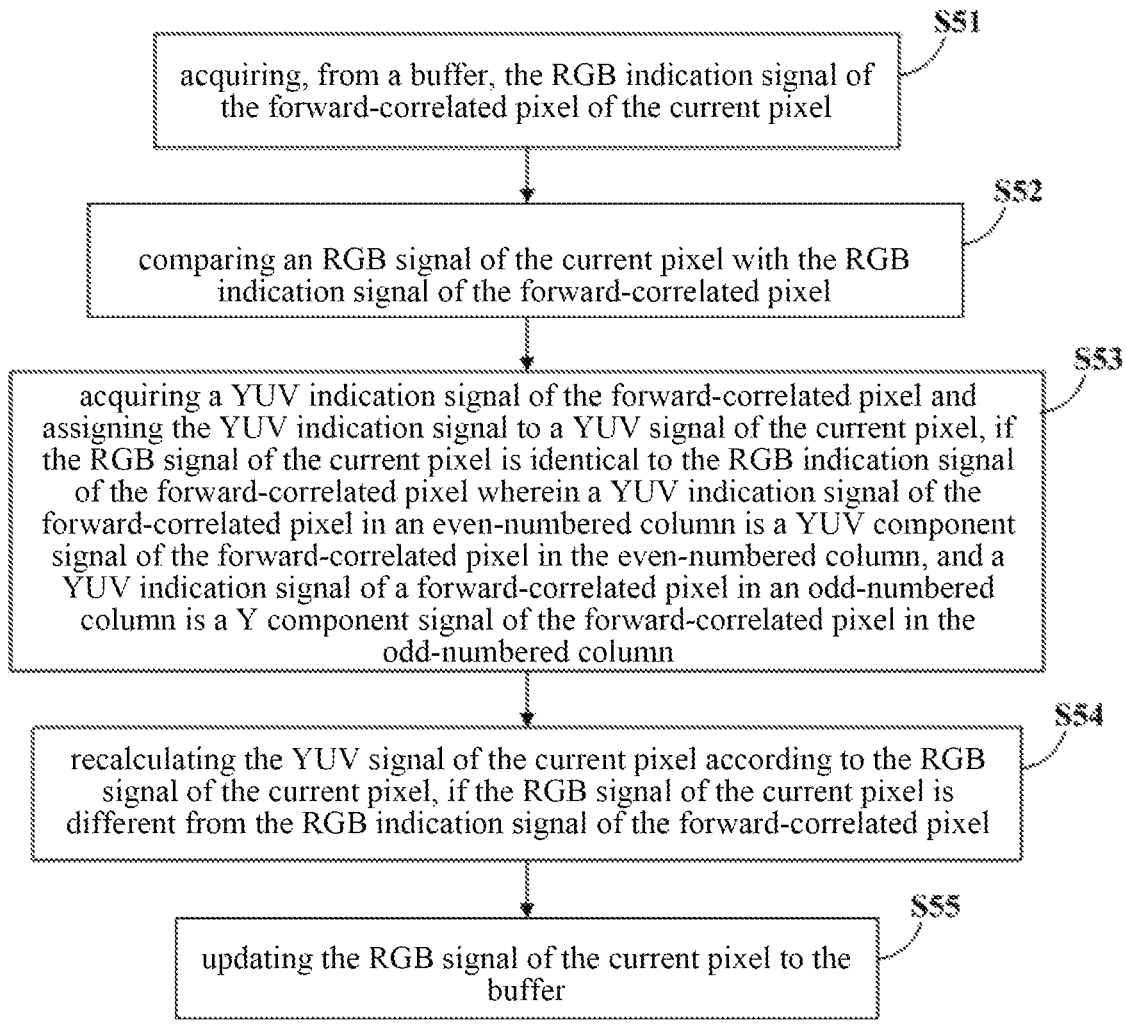
FIG. 5 is a flow chart of a digital image conversion method according to a fourth embodiment of the present disclosure.

Referring to FIG. 5, the digital image conversion method includes:

S51, an RGB indication signal of a forward-correlated pixel of a current pixel is acquired from a buffer.

Figure 6:
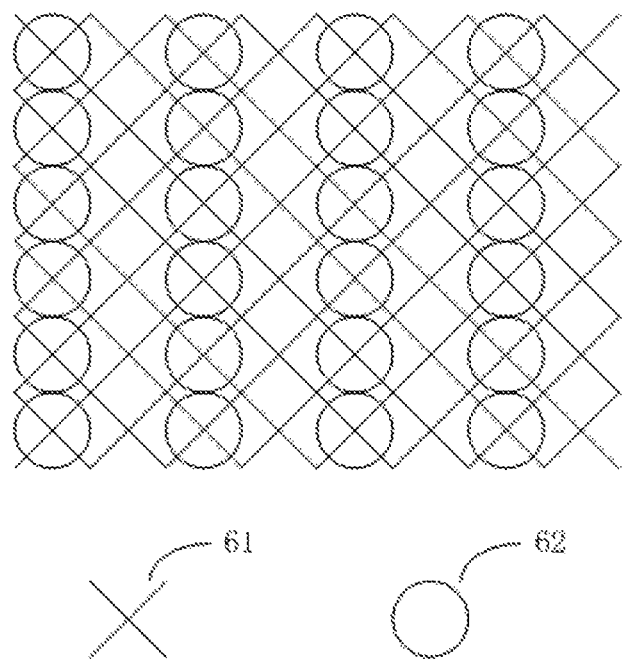
FIG. 6 is a schematic diagram showing a YUV422 data format.

FIG. 6 shows a YUV422 data format. Referring to FIG. 6, in the YUV422 format, only pixels in even-numbered columns have a complete YUV vector space, and pixels in odd-numbered columns do not have a complete YUV vector space. Specifically, a pixel in an even-numbered column not only has a corresponding Y component signal 61, but also has a corresponding U component signal and V component signal 62; while a pixel in an odd-numbered column has only a corresponding Y component signal 61.

As such, the format of the YUV signal of a pixel in an even-numbered column is different from the format of the YUV signal of a pixel in an odd-numbered column. Considering the difference in data format, when RGB signals are compared, the comparison is performed only between pixels in even-numbered columns, and between pixels in odd-numbered columns.

In the acquiring of the current pixel, the current pixel is still determined based on a progressive traversal order.

Due to the above-mentioned difference in data format, a pixel that is in a column spaced apart from the current pixel by one column is determined as the forward-correlated pixel. If the current pixel is at the start position of a row of pixels, the forward-correlated pixel of the current pixel is a pixel that is in a previous row and that is in a column spaced apart from the current pixel by one column according to the scanning order; if the current pixel is at another position of a row of pixels, the forward-correlated pixel of the current pixel is a pixel that is in the same row as the current pixel and that is in a column spaced apart from the current pixel by one column.

In addition, in the YUV422 image format, a YUV indication signal of a forward-correlated pixel in an even-numbered column is a Y component signal, a U component signal and a V component signal of the forward-correlated pixel in the even-numbered column, and a YUV indication signal of a forward-correlated pixel in an odd-numbered column is a Y component signal of the forward-correlated pixel in the odd-numbered column. The RGB indication signal is an RGB component signal.

S52, an RGB signal of the current pixel is compared with the RGB indication signal of the forward-correlated pixel.

S53, a YUV indication signal of the forward-correlated pixel is acquired and assigned to a YUV signal of the current pixel, if the RGB signal of the current pixel is the same as the RGB indication signal of the forward-correlated pixel.

A YUV indication signal of a forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

S54, the YUV signal of the current pixel is recalculated according to the RGB signal of the current pixel, if the RGB signal of the current pixel is different from the RGB indication signal of the forward-correlated pixel.

S55, the RGB signal of the current pixel is updated to the buffer.

In this embodiment, a next pixel is determined as the current pixel based on a progressive pixel traversal order, and a pixel that is in the same row as the current pixel or in a previous row and that is in a column spaced apart from the current pixel by one column is determined as the forward-correlated pixel, thereby reducing the amount of calculation required for converting RGB image data into image data in YUV422 format.

Fifth Embodiment

Based on the foregoing embodiment of the present disclosure, this embodiment further provides a technical solution of a digital image conversion method. This technical solution is specially used for converting an RGB image into an image in YUV420 format. In this technical solution, the current pixel is determined by using the following method: determining a next pixel as the current pixel based on an interlaced pixel traversal order. In addition, a pixel that is in the same row as the current pixel or in a row spaced apart from the current pixel by one row and that is in a column spaced apart from the current pixel by one column is determined as the forward-correlated pixel. The RGB indication signal is an RGB component signal, a YUV indication signal of a forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

Figure 7:
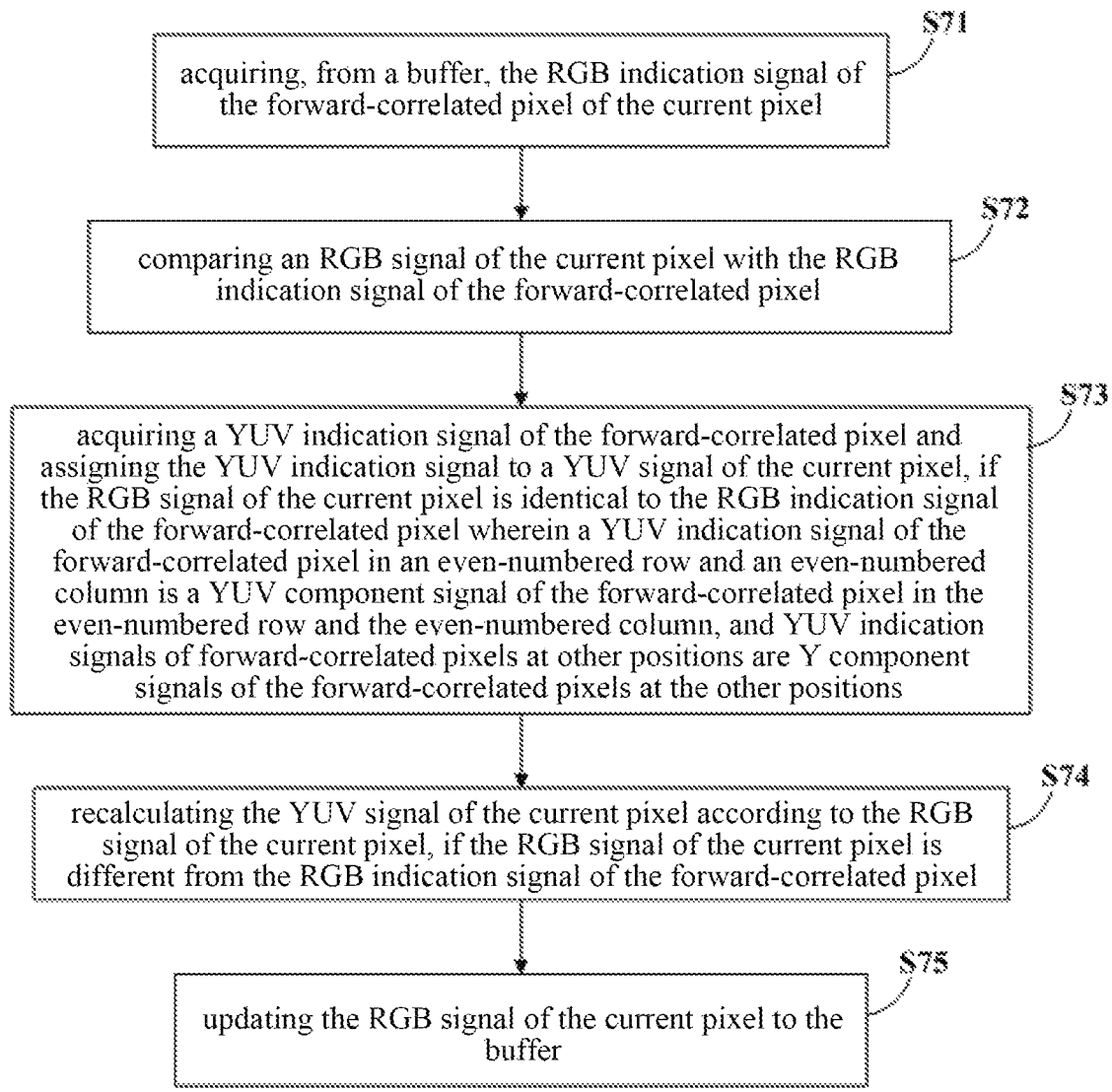
FIG. 7 is a flow chart of a digital image conversion method according to a fifth embodiment of the present disclosure.

Referring to FIG. 7, the digital image conversion method includes:

S71, an RGB indication signal of a forward-correlated pixel of a current pixel is acquired from a buffer.

Figure 8:
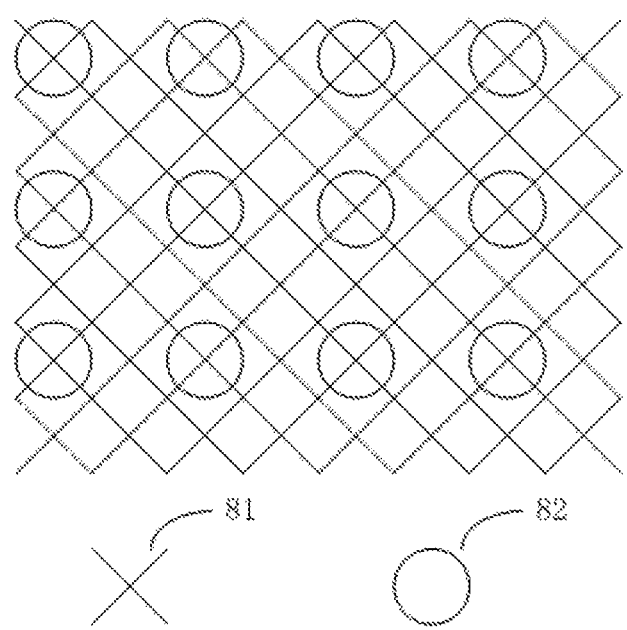
FIG. 8 is a schematic diagram showing a YUV420 data format.

FIG. 8 shows a YUV420 data format. Referring to FIG. 8, in the YUV420 format, only a pixel in an even-numbered row and an even-numbered column has a complete YUV vector space, and pixels at other positions do not have a complete YUV vector space. Specifically, a pixel in an even-numbered row and an even-numbered column not only has a corresponding Y component signal 81, but also has a corresponding U component signal and V component signal 82; while pixels at other positions have only a corresponding Y component signal 81.

In this embodiment, in the acquiring of the next pixel, a next pixel is determined as the current pixel based on an interlaced pixel traversal order.

Due to the above-mentioned difference in data format, a pixel that is in a column spaced apart from the current pixel by one column is determined as the forward-correlated pixel. If the current pixel is at the start position of a row of pixels, the forward-correlated pixel of the current pixel is a pixel that is in a previous row and that is in a column spaced apart from the current pixel by one column according to the scanning order; if the current pixel is at another position of a row of pixels, the forward-correlated pixel of the current pixel is a pixel that is in the same row as the current pixel and that is in a column spaced apart from the current pixel by one column.

Preferably, considering the particularity of the YUV420 format, buffers respectively for pixels in odd-numbered rows and pixels in even-numbered rows are provided, so as to respectively buffer RGB indication signals of forward-correlated pixels in odd-numbered rows and RGB indication signals of forward-correlated pixels in even-numbered rows.

In addition, the RGB indication signal is an RGB component signal.

S72, an RGB signal of the current pixel is compared with the RGB indication signal of the forward-correlated pixel.

S73, a YUV indication signal of the forward-correlated pixel is acquired and assigned to a YUV signal of the current pixel, if the RGB signal of the current pixel is the same as the RGB indication signal of the forward-correlated pixel.

A YUV indication signal of a forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

S74, the YUV signal of the current pixel is recalculated according to the RGB signal of the current pixel, if the RGB signal of the current pixel is different from the RGB indication signal of the forward-correlated pixel.

S75, the RGB signal of the current pixel is updated to the buffer.

In this embodiment, a next pixel is determined as the current pixel based on a progressive pixel traversal order, and a pixel that is in the same row as the current pixel or in a previous row and that is in a column spaced apart from the current pixel by one column is determined as the forward-correlated pixel, thereby reducing the amount of calculation required for converting RGB image data into image data in YUV420 format.

Sixth Embodiment

Figure 9:
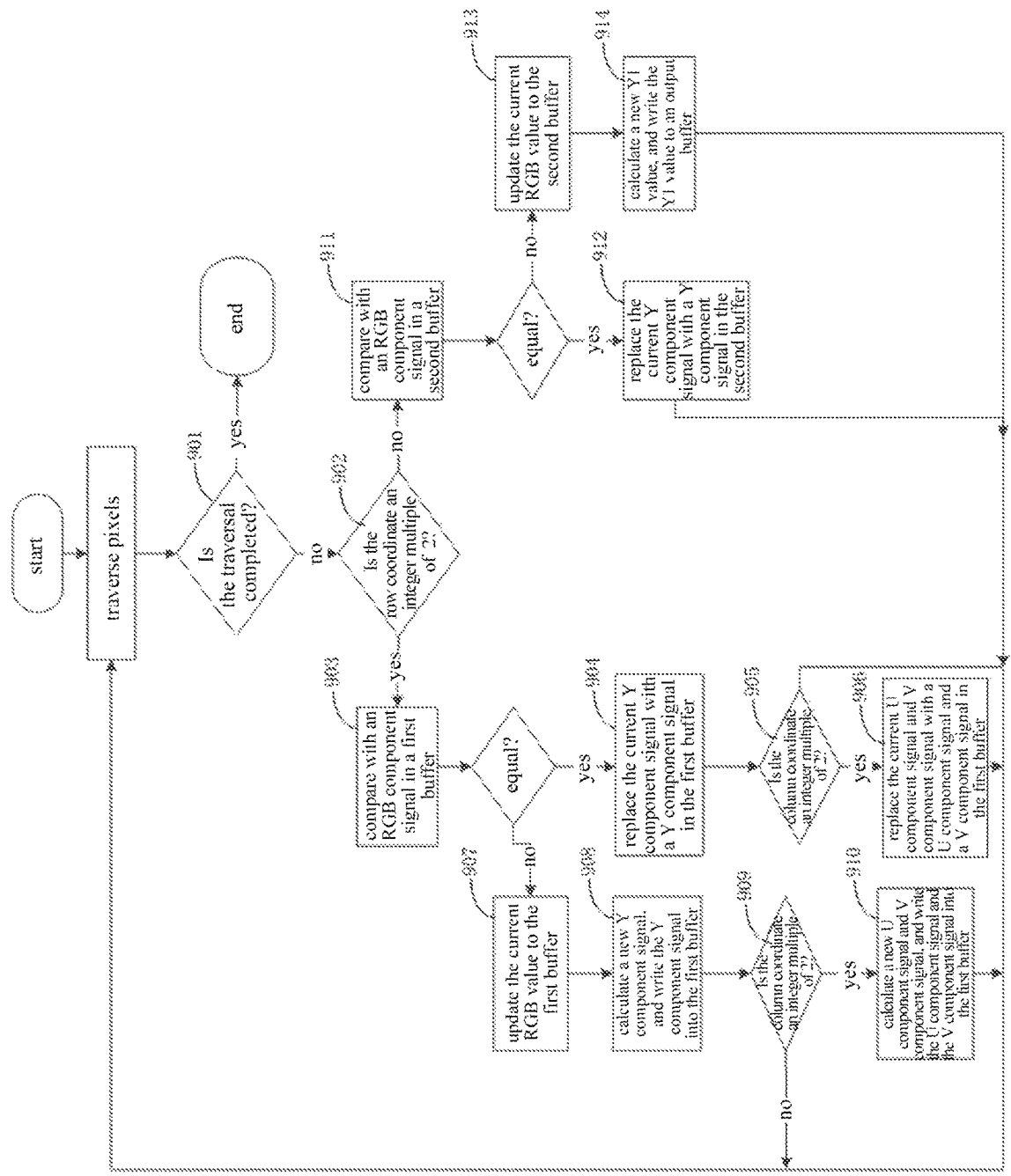
FIG. 9 is a flow chart of a digital image conversion method according to a sixth embodiment of the present disclosure.

This embodiment provides a preferred technical solution of a digital image conversion method. This preferred technical solution is specifically used for converting an RGB image into a YUV420 image. Specifically, referring to FIG. 9, the digital image conversion method includes:

S901, it is determined whether traversal of pixels in an image has been completed. If not, S902 is performed.

S902, it is determined whether the row coordinate of a current pixel is an integer multiple of 2. If the row coordinate is an integer multiple of 2, S903 is performed; otherwise, S911 is performed.

S903, an RGB component signal of the current pixel is compared with an RGB component signal in a first buffer. If the RGB component signal of the current pixel is equal to the RGB component signal in the first buffer, S904 is performed; otherwise, S907 is performed.

The first buffer is a buffer dedicated to pixels in even-numbered rows, and is specially used for storing RGB component signals of pixels in even-numbered rows.

S904, a Y component signal of the current pixel is replaced with a value of a Y component signal in the first buffer.

S905, if the column coordinate of the current pixel is an integer multiple of 2, S906 is performed; otherwise, conversion is performed for the next pixel.

S906, a U component signal and a V component signal of the current pixel are respectively replaced with values of a U component signal and a V component signal in the first buffer.

S907, the RGB component signal in the first buffer is updated by using the RGB component signal of the current pixel.

S908, the Y component signal of the current pixel is calculated, and the Y component signal is written into the first buffer.

S909, if the column coordinate of the current pixel is an integer multiple of 2, S910 is performed.

S910, the U component signal and the V component signal of the current pixel are calculated, and the U component signal and the V component signal are written into the first buffer.

S911, the RGB component signal of the current pixel is compared with an RGB component signal in a second buffer. If the RGB component signal of the current pixel is the same as the RGB component signal in the second buffer, S912 is performed; otherwise, S913 is performed.

The second buffer is a buffer dedicated to pixels in even-numbered rows, and is specially used for storing RGB component signals of pixels in odd-numbered rows.

S912, the Y component signal of the current pixel is replaced with a value of a Y component signal in the second buffer.

S913, the RGB component signal in the second buffer is updated by using the RGB component signal of the current pixel.

S914, the Y component signal of the current pixel is calculated, and the Y component signal is written into the second buffer.

In this embodiment, the RGB component signal of the current pixel is compared with RGB component signals in buffers one by one, thereby effectively reducing the amount of calculation required for converting an RGB image into a YUV image.

Seventh Embodiment

Figure 10:
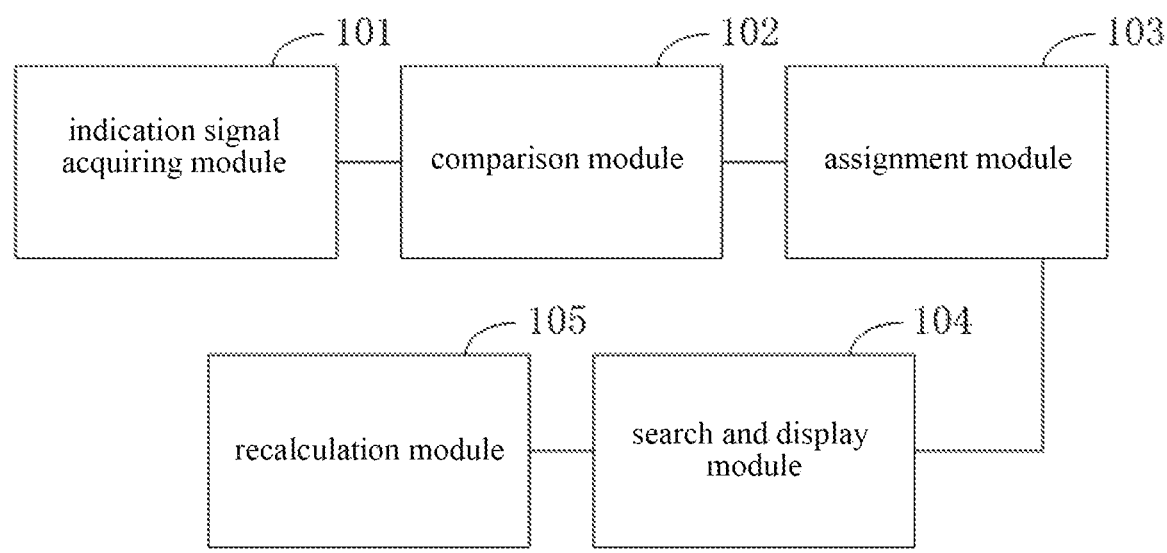
FIG. 10 is a structural diagram of a digital image conversion apparatus according to a seventh embodiment of the present disclosure.

This embodiment provides a technical solution of a digital image conversion apparatus. Referring to FIG. 10, in this technical solution, the digital image conversion apparatus includes: an indication signal acquiring module 101, a comparison module 102, an assignment module 103, and a recalculation module 104.

The indication signal acquiring module 101 is configured to acquire an RGB indication signal of a forward-correlated pixel of a current pixel.

The comparison module 102 is configured to compare an RGB signal of the current pixel with the RGB indication signal of the forward-correlated pixel.

The assignment module 103 is configured to acquire a YUV indication signal of the forward-correlated pixel and assign the YUV indication signal to a YUV signal of the current pixel, if the RGB signal of the current pixel is the same as the RGB indication signal of the forward-correlated pixel.

The recalculation module 104 is configured to recalculate the YUV signal of the current pixel according to the RGB signal of the current pixel, if the RGB signal of the current pixel is different from the RGB indication signal of the forward-correlated pixel.

Further, the indication signal acquiring module 101 is specifically configured to acquire, from a buffer, the RGB indication signal of the forward-correlated pixel of the current pixel; and the digital image conversion apparatus further includes a buffer updating module 105.

The buffer updating module 105 is configured to update the RGB signal of the current pixel to the buffer after the YUV signal of the current pixel is recalculated according to the RGB signal of the current pixel.

Further, the current pixel is determined by using one of the following methods:

determining a next pixel as the current pixel based on a set pixel traversal order;

determining a next pixel as the current pixel based on a progressive pixel traversal order; and determining a next pixel as the current pixel based on an interlaced pixel traversal order.

Further, if a next pixel is determined as the current pixel based on a set pixel traversal order, a previous pixel of the current pixel is determined as the forward-correlated pixel, where the RGB indication signal is an RGB component signal, and the YUV indication signal is a YUV component signal.

Further, if a next pixel is determined as the current pixel based on a progressive pixel traversal order, a pixel that is in the same row as the current pixel or in a previous row and that is in a column spaced apart from the current pixel by one column is determined as the forward-correlated pixel, where the RGB indication signal is an RGB component signal, a YUV indication signal of a forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

Further, if a next pixel is determined as the current pixel based on an interlaced pixel traversal order, a pixel that is in the same row as the current pixel or in a row spaced apart from the current pixel by one row and that is in a column spaced apart from the current pixel by one column is determined as the forward-correlated pixel, where the RGB indication signal is an RGB component signal, a YUV indication signal of a forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

The above product can execute the digital image conversion method provided in any embodiment of the present disclosure, and has corresponding functional modules for executing the method as well as beneficial effects. Technical details that are not described in this embodiment can be referred to the digital image conversion method provided in any embodiment of the present disclosure.

Eighth Embodiment

This embodiment provides a storage medium comprising computer executable instructions, the computer executable instructions when executed by a processor of a computer, causing the processor to execute a digital image conversion method, wherein the method comprises: acquiring an RGB indication signal of a forward-correlated pixel of a current pixel; comparing an RGB signal of the current pixel with the RGB indication signal of the forward-correlated pixel; acquiring a YUV indication signal of the forward-correlated pixel and assigning the YUV indication signal to a YUV signal of the current pixel, if the RGB signal of the current pixel is identical to the RGB indication signal of the forward-correlated pixel; and recalculating the YUV signal of the current pixel according to the RGB signal of the current pixel, if the RGB signal of the current pixel is different from the RGB indication signal of the forward-correlated pixel.

When the method is executed by the processor, the acquiring an RGB indication signal of a forward-correlated pixel of a current pixel comprises: acquiring, from a buffer, the RGB indication signal of the forward-correlated pixel of the current pixel.

After the recalculating the YUV signal of the current pixel according to the RGB signal of the current pixel, the method further comprises: updating the RGB signal of the current pixel to the buffer.

When the method is executed by the processor, the current pixel is determined by using one of the followings: determining a next pixel as the current pixel based on a set pixel traversal order; determining the next pixel as the current pixel based on a progressive pixel traversal order; and determining the next pixel as the current pixel based on an interlaced pixel traversal order.

When the method is executed by the processor, a previous pixel of the current pixel is determined as the forward-correlated pixel, if the next pixel is determined as the current pixel based on the set pixel traversal order.

The RGB indication signal is an RGB component signal, and the YUV indication signal is a YUV component signal.

When the method is executed by the processor, a pixel in an identical row with the current pixel or in a previous row and in a column spaced apart from the current pixel by a column is determined as the forward-correlated pixel, if the next pixel is determined as the current pixel based on the progressive pixel traversal order.

The RGB indication signal is an RGB component signal, a YUV indication signal of the forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

When the method is executed by the processor, a pixel in an identical row with the current pixel or in a row spaced apart from the current pixel by a row and in a column spaced apart from the current pixel by a column is determined as the forward-correlated pixel, if the next pixel is determined as the current pixel based on the interlaced pixel traversal order The RGB indication signal is an RGB component signal, a YUV indication signal of the forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

Ninth Embodiment

Figure 11:
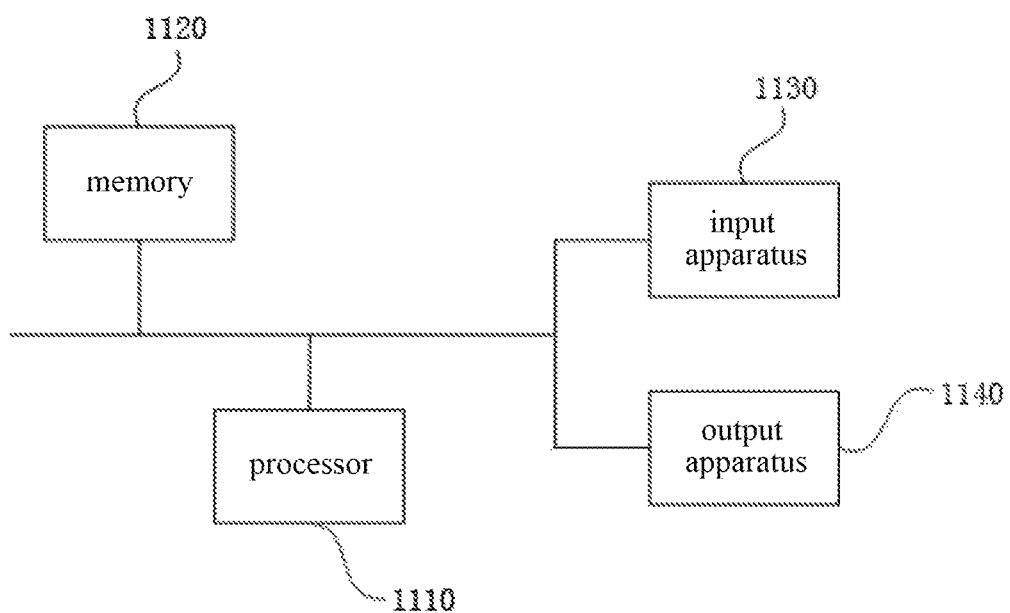
FIG. 11 is a schematic structural diagram of hardware of a device configured to execute a digital image conversion method according to a ninth embodiment of the present disclosure.

FIG. 11 is a schematic structural diagram of hardware of a device configured to execute a digital image conversion method according to a ninth embodiment of the present disclosure. Referring to FIG. 11, the device includes one or more processors 1110 (for example, one processor 1110 as shown in FIG. 11), a memory 1120 and one or more modules.

The device may further include an input apparatus 1130 and an output apparatus 1140. The processor 1110, memory 1120, input apparatus 1130 and output apparatus 1140 may be connected via a bus or another approach. For example, FIG. 11 shows the connection via the bus.

The memory 1120 as a computer readable storage medium can store a software program, a computer executable program and a module, such as the program instructions/modules corresponding to the image conversion method of the present disclosure (e.g. the indication signal acquiring module 101, the comparison module 102, the assignment module 103, the search and display module 104 and the recalculation module 105 in the digital image conversion apparatus as shown in FIG. 10). The processor 1110 executes various functions of the device and processes data by running the software program, computer executable program and module stored in the memory 1120, so as to implement the digital image conversion method of the above embodiment.

The memory 1120 may include a program storing region and a data storing region. The program storing region may store an operating system and an application required for at least one function. The data storing region may store data established for terminals' use, and the like. Moreover, the memory 1120 may include a high speed random access memory, and may include a non-volatile memory, such as at least one disk storage device, flash memory device, and other non-volatile solid memory device. In some embodiments, the memory 1120 may further include a memory disposed apart from the processor 1110, which may be connected to a terminal device via a network. The network includes by not limited to the Internet, intranet, LAN, mobile communication network, and the combination thereof.

The input apparatus 1130 may be configured to receive an input number or character message and generate a key signal input related to the terminal user settings and the function control. The output apparatus 1140 may include a display device, such as a display screen.

The one or more modules are stored in the memory 1120, and when executed by the one or more processors 1110, cause the one or more processors 1110 to perform operations. The operations include: acquiring an RGB indication signal of a forward-correlated pixel of a current pixel; comparing an RGB signal of the current pixel with the RGB indication signal of the forward-correlated pixel; acquiring a YUV indication signal of the forward-correlated pixel and assigning the YUV indication signal to a YUV signal of the current pixel, if the RGB signal of the current pixel is identical to the RGB indication signal of the forward-correlated pixel; and recalculating the YUV signal of the current pixel according to the RGB signal of the current pixel, if the RGB signal of the current pixel is different from the RGB indication signal of the forward-correlated pixel.

Further, the acquiring an RGB indication signal of a forward-correlated pixel of a current pixel comprises: acquiring, from a buffer, the RGB indication signal of the forward-correlated pixel of the current pixel.

After the recalculating the YUV signal of the current pixel according to the RGB signal of the current pixel, the method further comprises: updating the RGB signal of the current pixel to the buffer.

Further, the current pixel is determined by using one of the followings: determining a next pixel as the current pixel based on a set pixel traversal order; determining the next pixel as the current pixel based on a progressive pixel traversal order; and determining the next pixel as the current pixel based on an interlaced pixel traversal order.

Further, if the next pixel is determined as the current pixel based on the set pixel traversal order, a previous pixel of the current pixel is determined as the forward-correlated pixel.

The RGB indication signal is an RGB component signal, and the YUV indication signal is a YUV component signal.

Further, if the next pixel is determined as the current pixel based on the progressive pixel traversal order, a pixel in an identical row with the current pixel or in a previous row and in a column spaced apart from the current pixel by a column is determined as the forward-correlated pixel.

The RGB indication signal is an RGB component signal, a YUV indication signal of the forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

Further, if the next pixel is determined as the current pixel based on the interlaced pixel traversal order, a pixel in an identical row with the current pixel or in a row spaced apart from the current pixel by a row and in a column spaced apart from the current pixel by a column is determined as the forward-correlated pixel.

The RGB indication signal is an RGB component signal, a YUV indication signal of the forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

With the above description of the embodiments, it can be known by the skilled person in the art that the present disclosure may be implemented by means of software and necessary and general hardware. Although the embodiments may be implemented by means of only hardware, it is optimal to implement the embodiments by means of the combination of software and hardware. Based on this concept, the technical solutions of the present disclosure or the part of the present disclosure over the prior art may be embodied in the form of a software product. The computer software product may be stored in a computer readable storage medium, such as a floppy disk, a read-only memory (ROM), a random access memory (RAM), a flash memory, a hard disk or an optical disk, and may include some instructions for causing a computer device (a personal computer, a server, a network device or the like) to implement the method of embodiments of the present disclosure.

It should be noted that the units and modules in the embodiments of the digital image conversion apparatus are partitioned according to function logics, but not limited thereto, as long as the corresponding functions can be achieved. In addition, the specific names of the functional units are merely used to distinguish from each other, but not limit the scope of the present disclosure.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A digital image conversion method, comprising:
acquiring an RGB indication signal of a forward-correlated pixel of a current pixel;
comparing an RGB signal of the current pixel with the RGB indication signal of the forward-correlated pixel;
acquiring a YUV indication signal of the forward-correlated pixel and assigning the YUV indication signal to a YUV signal of the current pixel, if the RGB signal of the current pixel is identical to the RGB indication signal of the forward-correlated pixel; and
recalculating the YUV signal of the current pixel according to the RGB signal of the current pixel, if the RGB signal of the current pixel is different from the RGB indication signal of the forward-correlated pixel,
wherein, according to different YUV data formats, the different YUV data formats comprising a YUV 422 data format and a YUV 420 data format, the forward-correlated pixel is in an identical row with the current pixel and the forward-correlated pixel and the current pixel are two columns apart, or the forward-correlated pixel is in a previous row and the forward-correlated pixel and the current pixel are two columns apart, or the forward-correlated pixel and the current pixel are two rows apart and two columns apart.

2. The method according to claim 1, wherein
the acquiring an RGB indication signal of a forward-correlated pixel of a current pixel comprises: acquiring, from a buffer, the RGB indication signal of the forward-correlated pixel of the current pixel; and
after the recalculating the YUV signal of the current pixel according to the RGB signal of the current pixel, the method further comprises: updating the RGB signal of the current pixel to the buffer.

3. The method according to claim 1, wherein
the current pixel is determined by using one of the following:
determining a next pixel as the current pixel based on a set pixel traversal order;
determining the next pixel as the current pixel based on a progressive pixel traversal order; and
determining the next pixel as the current pixel based on an interlaced pixel traversal order.

4. The method according to claim 3, wherein
in response to a YUV444 data format and the next pixel being determined as the current pixel based on the set pixel traversal order, a previous pixel of the current pixel is determined as the forward-correlated pixel,
the RGB indication signal is an RGB component signal, and the YUV indication signal is a YUV component signal.

5. The method according to claim 3, wherein
in response to the YUV422 data format and the next pixel being determined as the current pixel based on the progressive pixel traversal order, a previous pixel in an identical row with the current pixel and the previous pixel being two columns apart from the current pixel, or a previous pixel in a previous row and the previous pixel being two columns apart from the current pixel is determined as the forward-correlated pixel,
the RGB indication signal is an RGB component signal, a YUV indication signal of the forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

6. The method according to claim 3, wherein
in response to the YUV420 data format and the next pixel being determined as the current pixel based on the interlaced pixel traversal order, a previous pixel in an identical row with the current pixel and the previous pixel being two columns apart from the current pixel, or a previous pixel two rows apart from the current pixel and the previous pixel being two columns apart from the current pixel is determined as the forward-correlated pixel,
the RGB indication signal is an RGB component signal, a YUV indication signal of the forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

7. A non-transitory storage medium comprising computer executable instructions, the computer executable instructions when executed by a processor of a computer, causing the processor to execute a digital image conversion method, wherein the method comprises:
acquiring an RGB indication signal of a forward-correlated pixel of a current pixel;
comparing an RGB signal of the current pixel with the RGB indication signal of the forward-correlated pixel;
acquiring a YUV indication signal of the forward-correlated pixel and assigning the YUV indication signal to a YUV signal of the current pixel, if the RGB signal of the current pixel is identical to the RGB indication signal of the forward-correlated pixel; and
recalculating the YUV signal of the current pixel according to the RGB signal of the current pixel, if the RGB signal of the current pixel is different from the RGB indication signal of the forward-correlated pixel,
wherein, according to different YUV data formats, the different YUV data formats comprising a YUV 422 data format and a YUV 420 data format, the forward-correlated pixel is in an identical row with the current pixel and the forward-correlated pixel and the current pixel are two columns apart, or the forward-correlated pixel is in a previous row and the forward-correlated pixel and the current pixel are two columns apart, or the forward-correlated pixel and the current pixel are two rows apart and two columns apart.

8. A device, comprising:
one or more processors; and
a memory;
wherein one or more programs are stored in the memory, and when executed by the one or more processors, cause the one or more processors to perform operations, the operations comprise:
acquiring an RGB indication signal of a forward-correlated pixel of a current pixel;
comparing an RGB signal of the current pixel with the RGB indication signal of the forward-correlated pixel;
acquiring a YUV indication signal of the forward-correlated pixel and assigning the YUV indication signal to a YUV signal of the current pixel, if the RGB signal of the current pixel is identical to the RGB indication signal of the forward-correlated pixel; and
recalculating the YUV signal of the current pixel according to the RGB signal of the current pixel, if the RGB signal of the current pixel is different from the RGB indication signal of the forward-correlated pixel,
wherein, according to different YUV data formats, the different YUV data formats comprising a YUV 422 data format and a YUV 420 data format, the forward-correlated pixel is in an identical row with the current pixel and the forward-correlated pixel and the current pixel are two columns apart, or the forward-correlated pixel is in a previous row and the forward-correlated pixel and the current pixel are two columns apart, or the forward-correlated pixel and the current pixel are two rows apart and two columns apart.

9. The device according to claim 8, wherein
the acquiring an RGB indication signal of a forward-correlated pixel of a current pixel comprises: acquiring, from a buffer, the RGB indication signal of the forward-correlated pixel of the current pixel; and
after the recalculating the YUV signal of the current pixel according to the RGB signal of the current pixel, the operations further comprises: updating the RGB signal of the current pixel to the buffer.

10. The device according to claim 8, wherein
the current pixel is determined by using one of the following:
determining a next pixel as the current pixel based on a set pixel traversal order;
determining the next pixel as the current pixel based on a progressive pixel traversal order; and
determining the next pixel as the current pixel based on an interlaced pixel traversal order.

11. The device according to claim 10, wherein
in response to a YUV444 data format and the next pixel being determined as the current pixel based on the set pixel traversal order, a previous pixel of the current pixel is determined as the forward-correlated pixel,
the RGB indication signal is an RGB component signal, and the YUV indication signal is a YUV component signal.

12. The device according to claim 10, wherein
in response to the YUV422 data format and the next pixel being determined as the current pixel based on the progressive pixel traversal order, a previous pixel in an identical row with the current pixel and the previous pixel being two columns apart from the current pixel, or a previous pixel in a previous row and the previous pixel being two columns apart from the current pixel is determined as the forward-correlated pixel,
the RGB indication signal is an RGB component signal, a YUV indication signal of the forward-correlated pixel in an even-numbered column is a YUV component signal of the forward-correlated pixel in the even-numbered column, and a YUV indication signal of a forward-correlated pixel in an odd-numbered column is a Y component signal of the forward-correlated pixel in the odd-numbered column.

13. The device according to claim 10, wherein
in response to the YUV420 data format and the next pixel being determined as the current pixel based on the interlaced pixel traversal order, a previous pixel in an identical row with the current pixel and the previous pixel being two columns apart from the current pixel, or a previous pixel two rows apart from the current pixel and the previous pixel being two columns apart from the current pixel is determined as the forward-correlated pixel,
the RGB indication signal is an RGB component signal, a YUV indication signal of the forward-correlated pixel in an even-numbered row and an even-numbered column is a YUV component signal of the forward-correlated pixel in the even-numbered row and the even-numbered column, and YUV indication signals of forward-correlated pixels at other positions are Y component signals of the forward-correlated pixels at the other positions.

* * * * *